(12) United States Patent
Gruenwald

(10) Patent No.: US 9,785,824 B2
(45) Date of Patent: Oct. 10, 2017

(54) APPARATUS AND A METHOD FOR DETECTING A MOTION OF AN OBJECT IN A TARGET SPACE

(71) Applicant: Infineon Technologies AG, Neubiberg (DE)

(72) Inventor: Johannes Gruenwald, Graz (AT)

(73) Assignee: Infineon Technologies AG, Neubiberg (DE)

( * ) Notice: Subject to any disclaimer, the term of this patent is extended or adjusted under 35 U.S.C. 154(b) by 415 days.

(21) Appl. No.: 14/253,080

(22) Filed: Apr. 15, 2014

(65) Prior Publication Data

US 2015/0294142 A1   Oct. 15, 2015

(51) Int. Cl.
*H04N 13/02* (2006.01)
*H04N 13/00* (2006.01)
*G01S 17/36* (2006.01)
*G06K 9/00* (2006.01)
*G01S 17/50* (2006.01)
*G01S 17/89* (2006.01)
*G01S 7/497* (2006.01)

(52) U.S. Cl.
CPC .......... *G06K 9/00201* (2013.01); *G01S 7/497* (2013.01); *G01S 17/36* (2013.01); *G01S 17/50* (2013.01); *G01S 17/89* (2013.01); *H04N 13/0207* (2013.01); *H04N 13/0253* (2013.01); *H04N 2013/0085* (2013.01)

(58) Field of Classification Search
CPC ................ G01S 17/36; H04N 13/0207; H04N 13/0253; H04N 2013/0085
See application file for complete search history.

(56) References Cited

U.S. PATENT DOCUMENTS

| 6,914,552 B1 * | 7/2005 | McEwan ............. G01S 13/0209 |
| | | 342/193 |
| 7,973,699 B2 | 7/2011 | Krikorian et al. |
| 8,730,091 B2 | 5/2014 | Sathyendra et al. |
| 8,891,898 B2 | 11/2014 | Gohshi |

(Continued)

FOREIGN PATENT DOCUMENTS

DE   10 2010 039 295.2   * 8/2010   ............. G01S 17/32

OTHER PUBLICATIONS

Mirko Schmidt "Analysis, Modeling and Dynamic Optimization of 3D Time-of-Flight Imaging System" Dissertation University of Heidelberg 2011, p. 1-158.

*Primary Examiner* — Reza Aghevli
(74) *Attorney, Agent, or Firm* — Eschweiler & Potashnik, LLC

(57) ABSTRACT

An apparatus for detecting a motion of an object in a target space, wherein the object is located at a distance from an image-capturing device which is configured to measure the distance and to provide a sensor signal indicative of the distance, the sensor signal being decomposable in a decomposition including odd harmonics if the object is at rest. The apparatus includes a determining module configured to receive the sensor signal and to generate at least one motion signal which depends on at least one even harmonic of the decomposition of the sensor signal; and a detection module configured to detect the motion of the object based on the at least one motion signal and to provide a detection signal indicating the motion of the object.

16 Claims, 11 Drawing Sheets

(56) References Cited

U.S. PATENT DOCUMENTS

| | | | |
|---|---|---|---|
| 2005/0104765 A1* | 5/2005 | Bandhauer | G01S 7/4004 342/82 |
| 2007/0058157 A1* | 3/2007 | Deines | G01P 3/366 356/28 |
| 2007/0182949 A1* | 8/2007 | Niclass | G01C 3/08 356/3 |
| 2012/0098935 A1* | 4/2012 | Schmidt | G01S 17/89 348/46 |
| 2013/0177236 A1 | 7/2013 | Kim et al. | |
| 2013/0229508 A1* | 9/2013 | Li | G06F 1/3287 348/77 |
| 2013/0245436 A1* | 9/2013 | Tupin, Jr. | A61B 5/0444 600/430 |
| 2013/0342671 A1* | 12/2013 | Hummel | G06K 9/6202 348/77 |
| 2014/0078264 A1* | 3/2014 | Zhang | G06T 7/0057 348/47 |
| 2015/0145764 A1* | 5/2015 | Hiromi | G06F 3/0304 345/156 |
| 2015/0338509 A1* | 11/2015 | Lange | G01S 17/36 356/5.01 |

\* cited by examiner

Motion Artifacts ⇔ Spectral Distortion ⇔ Even Harmonics
INFORMATION

FIG 11
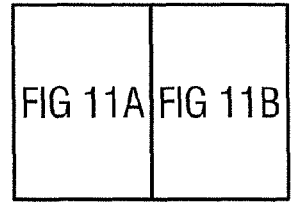
FIG 11A
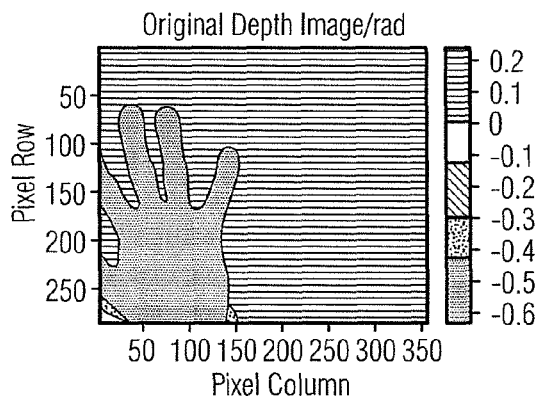
Original Depth Image/rad
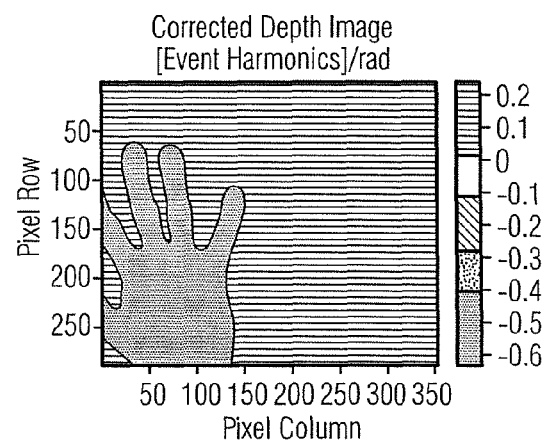
Corrected Depth Image [Event Harmonics]/rad
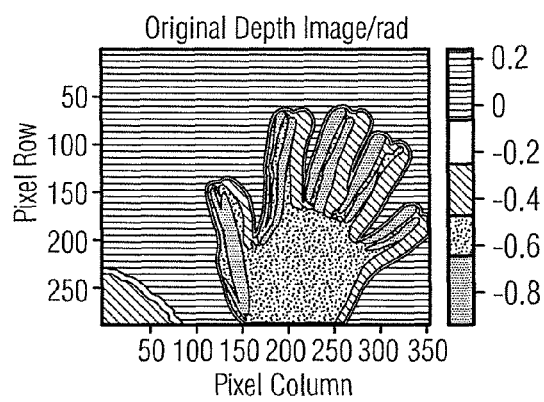
Original Depth Image/rad
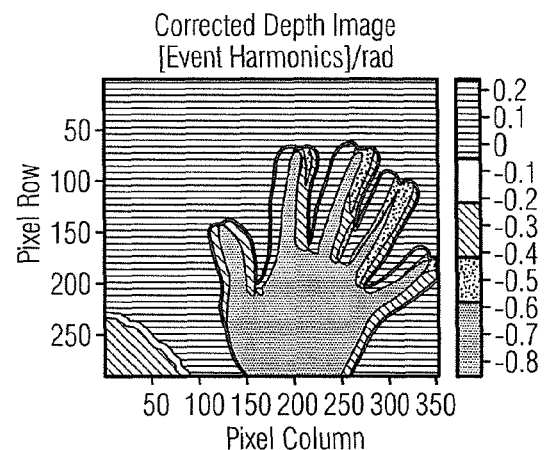
Corrected Depth Image [Event Harmonics]/rad
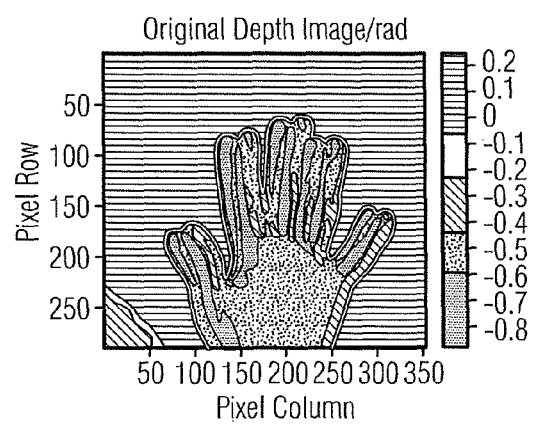
Original Depth Image/rad
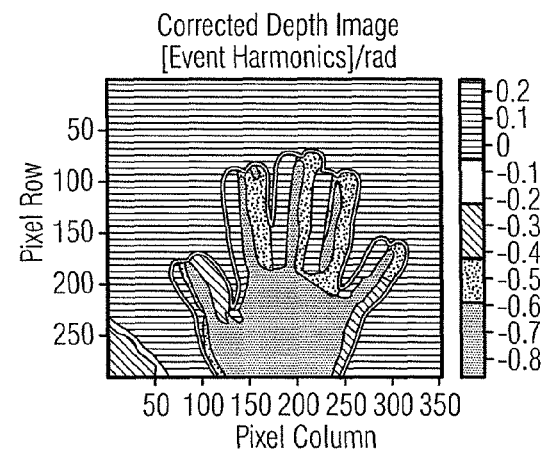
Corrected Depth Image [Event Harmonics]/rad

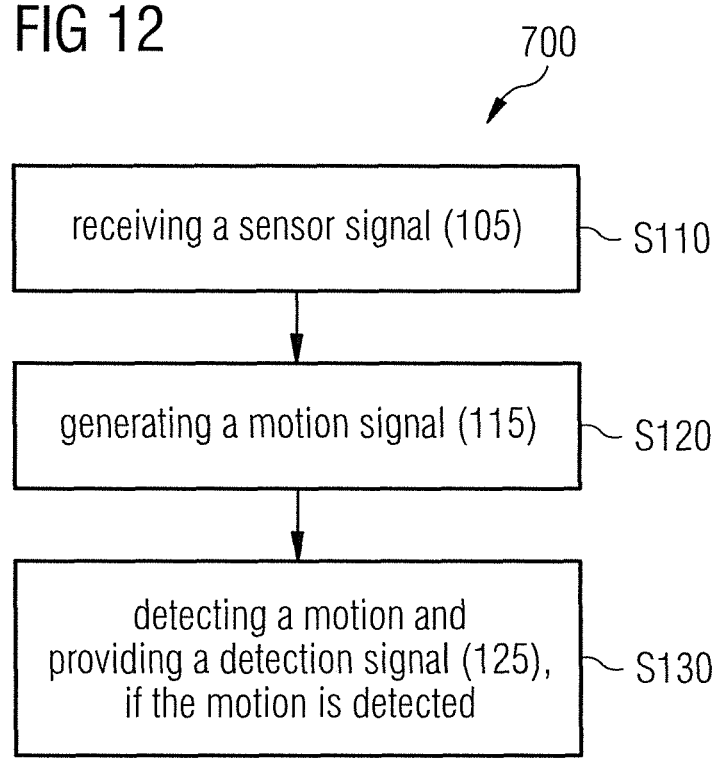

APPARATUS AND A METHOD FOR DETECTING A MOTION OF AN OBJECT IN A TARGET SPACE

FIELD

The present disclosure relates to an apparatus and a method for detecting a motion of an object in a target space and, in particular, to a pixel-based and memory-less on-chip measurement of motion artifacts in Time-Of-Flight (ToF) imaging.

BACKGROUND

In recent times three-dimensional imaging techniques, such as ToF, gain an increased interest. However, in order to determine correctly the distance from the imaging device to an object in the scene it is needed to perform a distance measurement which typically takes a certain period of time. On the other hand, if the object moves during this certain period of time, artifacts can be generated because during the motion the object changes its position and it cannot be uniquely defined where the object is located. Such artifacts have to be taken into account if the three dimensional image shall be further processed.

SUMMARY

There is a demand of providing an apparatus and a method for detecting a motion of an object in a target space in order to enable an imaging device to take into consideration motion artifacts.

The present disclosure relates to an apparatus for detecting a motion of an object in a target space, wherein the object is located at a distance from an image-capturing device which is configured to measure the distance and to provide a sensor signal indicative of the distance, the sensor signal being decomposable in a decomposition comprising odd harmonics if the object is at rest. The apparatus comprises: a determining module configured to receive the sensor signal and to generate at least one motion signal based on at least one even harmonic of the decomposition of the sensor signal. The apparatus further comprises a detection module configured to detect the motion of the object based on the at least one motion signal for each frame and to provide a detection signal indicating the motion of the object.

The present disclosure further relates to an apparatus for detecting a motion of an object in a target space, the object being located at a distance from an image capturing device which is configured to emit a wave and to receive a reflected wave being reflected at the object to capture an image from the object, the image-capturing device being further configured to provide a sensor signal which depends on the reflected wave, wherein the emitted wave comprises a predetermined wavelength and the image comprises a plurality of pixels. The apparatus comprises a combining module configured to receive the sensor signal as a plurality of sample values associated with the predetermined wavelength and to form a combination of the plurality of sample values such that the combination comprises a predetermined value if the object is at rest. The apparatus further comprises a detection module configured to detect a deviation from the predetermined value of the combination indicating the motion of the object, wherein the detection module is further configured to output a detection signal indicating the detected deviation from the predetermined value as a signal indicating the motion of the object.

The present disclosure further relates to a method for detecting a motion of an object in a target space, wherein the object is located at a distance from an image capturing device which is configured to measure the distance and to provide a sensor signal indicative of the distance, the sensor signal being decomposable in a decomposition comprising odd harmonics if the object is at rest. The method comprises receiving the sensor signal comprising an arbitrary number of substantially equidistantly sampled values per frame; generating at least one motion signal based on at least one even harmonic in the decomposition of the sensor signal; and detecting the motion of the object based on the at least one motion signal and providing a detection signal indicating the motion of the object.

BRIEF DESCRIPTION OF THE DRAWINGS

Some examples of the apparatuses and/or methods will be described in the following by way of examples only, and with reference to the accompanying Figures, in which:

FIG. 12 shows a block diagram of a method for detecting a motion of an object in a target space.

DETAILED DESCRIPTION

Figure 1A:
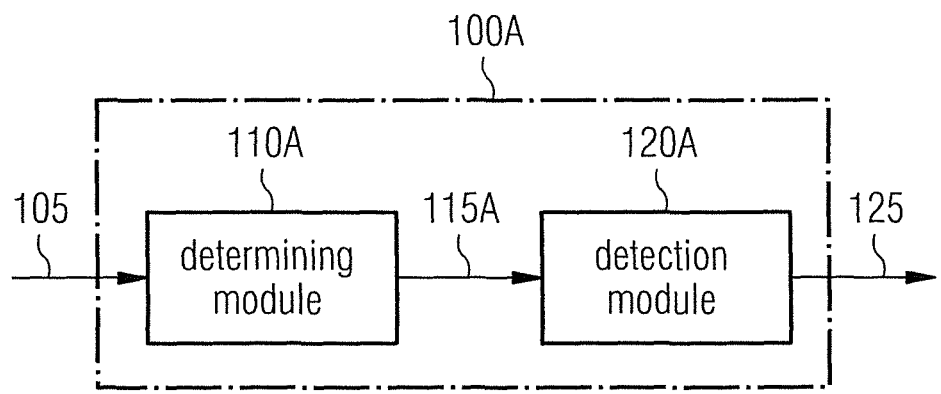
FIG. 1A depicts a block diagram of an apparatus for detecting a motion of an object.

Time-Of-Flight (ToF) is a 3D-imaging technique based on propagation delay measurements of emitted (and reflected) waves such as light beams, infrared radiation or other electromagnetic waves or sound waves. The emitted wave may be modulated at a certain frequency $f_{mod}$ (for example between 20 kHz to 100 MHz or 5 MHz to 50 MHz or about 20 MHz) and the imaging device may have a sensor which is able, at the time of return of the emitted wave, to reconstruct the propagated distance from its phase shift and the propagation speed of the wave (as, for example, the speed of light). The phase shift in turn is estimated by correlating the incident signal with its non-delayed pendant. For example, the emitted wave on the chip or its phase information can be transmitted to a processing unit that may use this information to generate a correlation function from the reflected wave (e.g. by combining both waves). In this process, the output of one pixel of the image can be given by N equidistant samples of the generated correlation function, which is also known as the sensor-response function (SRF). The number of samples can be selected by compromising between the accuracy with the computational effort. Possible sample numbers are: N=3, 4, 6, 8, . . . . The shape of the sensor response function may vary between a triangular and a sinusoidal shape which depends on the modulation frequency.

Various examples will now be described in more detail with reference to the accompanying drawings in which some examples are illustrated. In the figures, the thicknesses of lines, layers and/or regions may be exaggerated for clarity.

Accordingly, while examples are capable of various modifications and alternative forms, the illustrative examples in the figures will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, may be interpreted as having a meaning that is consistent with their meaning in the context of the relevant art and will not be interpreted in an idealized or overly formal sense unless expressly so defined herein.

FIG. 1A depicts an apparatus 100A for detecting a motion of an object in a target space, wherein the object is located at a distance from an image-capturing device, which is configured to measure the distance and to provide a sensor signal indicative of the distance. The sensor signal 105 being decomposable in a decomposition comprising odd order harmonics of a (identified) fundamental if the object is at rest (in relation to the image-capturing device). The apparatus 100A comprises a determining module 110A configured to receive the sensor signal 105 and to generate at least one motion signal 115A based on at least one even order harmonic of the (identified) fundamental of the decomposition of the sensor signal 105 and a detection module 120A configured to detect the motion of the object based on the at least one motion signal 115 and, if the motion has been detected, to provide a detection signal 125 indicating the motion of the object.

It is understood that in real detection odd and even harmonics may always be present (e.g. due to noise and/or signal processing) and to consider only one type of harmonic which relates to an idealized situation, for example. Therefore, when referring to a decomposition comprising only odd harmonics, if the object is at rest, one may refer to the situation where the contribution of even harmonics is below a predetermined threshold value (e.g. below 1% or below 10% of a total signal) so that the contribution of the even harmonics can be neglected or considered as noise, for example.

For example, the determining module 110 or the detection module 120 determines whether a portion of harmonics of even order of a fundamental within a decomposition of the sensor signal is above or below a predetermined threshold. For example, the portion of harmonics of even order of a fundamental within a decomposition of the sensor signal may be below the predetermined threshold for an object at rest and the portion of harmonics of even order of a fundamental within a decomposition of the sensor signal may be above the predetermined threshold for an object in motion.

In the apparatus 100A the image-capturing device 200 is optionally configured to capture an image comprising a plurality of pixels, and the determining module 110A is optionally configured to receive the sensor signal 105 and to generate the motion signal 115A for each pixel of the plurality of pixels without relying on neighboring pixels of the plurality of pixels.

In the apparatus 110A the image capturing device 200 is optionally configured to emit a wave 210e, to receive a reflected wave 210r being reflected at the object 102 to capture an image from the object 102, and optionally to provide the sensor signal 105 as a sensor response function. The apparatus 100A may further comprise a sampling module configured to sample the sensor signal 105 such that at least one portion of each wavelength of the reflected wave 210r is sampled by N values.

In the apparatus 100A the number of samples N may optionally be even and the at least one even harmonic has the order N/2.

In the apparatus 100A the motion signal 115A is optionally derived only from the N sample values associated with the at least one portion of each sampled wavelength of the reflected wave 210r.

In the apparatus 100A the at least one even harmonic in the motion signal 115A is optionally the second harmonic.

In apparatus 100A the at least one even harmonic in the motion signal 115A optionally further comprises the zeroth harmonic representing an offset.

An example relates to an apparatus 100 for detecting a motion of an object in a target space, wherein the object is located at a distance from an image-capturing device, which is configured to measure the distance and to provide a sensor signal indicative of the distance. The sensor signal 105 being decomposable in a decomposition comprising only odd harmonics if the object is at rest. The apparatus 100 comprises a determining module 110 configured to receive the sensor signal 105 and to generate at least one motion signal 115 which depends on at least one even harmonic of the decomposition of the sensor signal 105 and a detection module 120 configured to detect the motion of the object based on the at least one motion signal 115 and, if the motion has been detected, to provide a detection signal 125 indicating the motion of the object.

Figure 1B:
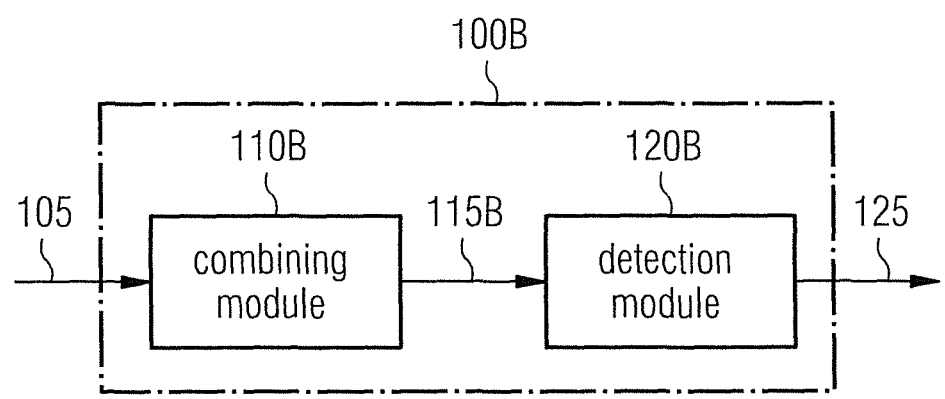
FIG. 1B depicts a block diagram of a further apparatus for detecting a motion of an object.

FIG. 1B depicts a further apparatus 100B for detecting a motion of an object in a target space comprises a combining module 110B and a detection module 120B. The object is located at a distance from an image capturing device (not shown and may or may not be part of the apparatus 100B) which is configure to emit a wave and to receive a reflected wave being reflected at the object to capture an image from the object. The image capturing device is further configured to provide a sensor signal which depends on the reflected wave, wherein the emitted wave comprises a predetermined wavelength and the image comprises a plurality of pixels. The combining module 110B is configured to receive the sensor signal 105 as a plurality of sample values associated with the predetermined wavelength and to form a combination 115B of the plurality of sample values such that the combination 115B comprises a predetermined value if the object is at rest. The detection module 120B is configured to detect a deviation from the predetermined value of the combination 115B indicating the motion of the object, wherein the detection module 120B is further configured to output a detection signal 125 indicating the detected deviation from the predetermined value as a signal indicating the motion of the object.

In the apparatus 100B the combination 115B of samples may represent optionally an even harmonic in a discrete Fourier decomposition of the plurality of samples derived from the sensor signal 105.

In the apparatus 100B the combination 115B of samples is optionally a function depending on an alternating sum of subsequent sample values taken within one period of the predetermined wavelength.

In the apparatus 100B the detection module 120B is optionally further configured to generate a further combination of the plurality of samples which depends on the sum of subsequent sample values taken within one period of the predetermined wavelength.

In the apparatus 100A or the apparatus 100B detection module 120A, B may further be configured to detect a direction of the motion. This detection may be carried out based on the zeroth harmonic or the respective combination of samples (e.g the sum).

Figure 2:
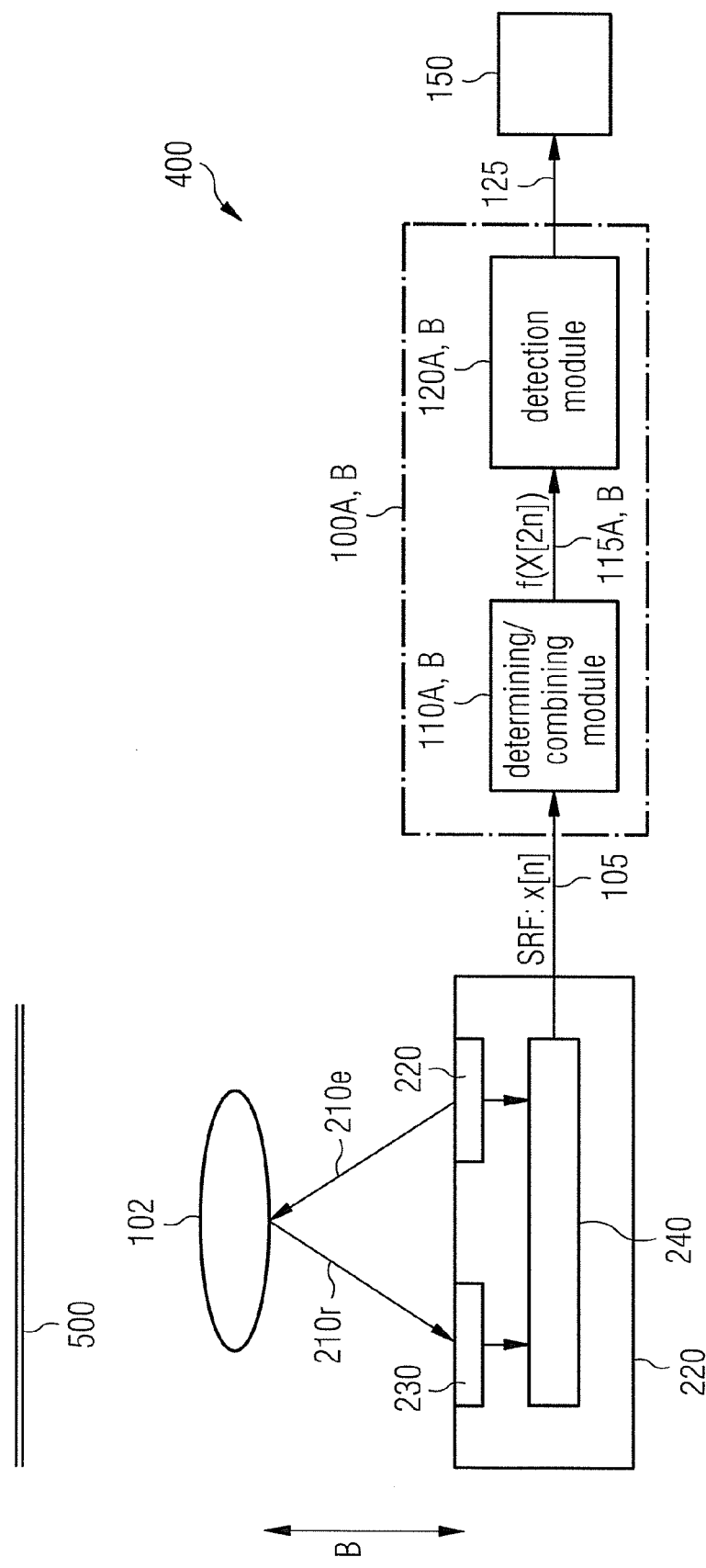
FIG. 2 depicts a system including the apparatus for detecting the motion of the object.

The apparatus 100A or the apparatus 100B as depicted in FIGS. 1A, 1B can, for example, be incorporated in a system 300 as shown in FIG. 2. In detail, the system 400 of FIG. 2 comprises an image-capturing device 200 coupled to the apparatus 100A to provide the sensor signal 105, wherein the image-capturing device 200 may be configured to capture a 3-dimensional image of the target space (i.e. including depth information of objects in the target space). To derive the depth, the image capturing device 200 comprises a wave emitter 220 and a wave receiver 230. The wave emitter 220 is configured to emit a wave 210e in the target space with an object 102 at a distance B. The emitted wave 210e propagates to the object 102, is at least in part reflected at the object 102 and returns to the image-capturing device 200 as reflected wave 210r. The wave receiver 230 is configured to receive the reflected wave 210r from the object 102. The apparatus 100B can be included in the system 400 in the same way as the apparatus 100A, i.e. the apparatus 100A can be replaced by the apparatus 100B.

The object 102 is located within the target space in the distance B from the image capturing device 200 in front of a background 500, which may also reflect the emitted wave 210e. The wave 210 needs a time period for its propagation along its path to and from the object 102, which can be used to calculate the distance B by using the propagation speed of the wave. For example, if the wave is a light signal or another electromagnetic wave signal (as, for example, an infrared wave or a radio wave signal), the propagation speed is the speed of light, whereas for using acoustic waves the propagation speed is the speed of acoustic waves propagating, for example, in air.

The reflected wave signal 210r is correlated to the emitted wave signal 210e, because the reflected wave signal 210r is a delayed version of the emitted wave signal 210e reflected at the object. As long as the object 102 is at rest and does not move, both the emitted wave signal 210e and the reflected wave signal 210r comprise the same frequency. When arriving at the wave receiver 230, the time period that the wave signal needed to travel from the image capturing device to the object 102 and to return from the object 102 to the image-capturing device 200 may be measured based on the phase shift of the arriving signal of the reflected wave 210r at the wave receiver 230 when compared to the emitted wave 210e. Further details will be set out in connection with FIG. 3.

The image-capturing device 200 forwards information about at least part of the received wave signal 210r (or a signal based on this wave signal) to the apparatus 100A (or the apparatus 100B). In addition, at least some information may likewise passed from the light emitter 220 to the apparatus 100A (or the apparatus 100B). For example, in order to be able to calculate a phase shift of the reflected wave signal 210r compared to the emitted wave signal 210e, at least a signal indicating the phase of the emitted wave 210 at the moment of emission (e.g. a zero crossing of the emitted light signal 211) may be forwarded as part of the sensor signal 105 to the apparatus 100A (or the apparatus 100B) or may be incorporated in some way in the sensor signal 105 (e.g. as sensor response function). The image-capturing device 200 may further comprise a processing module 240 which is configured to receive the reflected wave signal 210r and the emitted wave signal 210e (or the signal indicative of its phase) and may be further configured to determine a correlation function (the sensor response function SRF) based on the received signals. The correlation function may be obtained as a discrete set of samples x[n] obtained by sampling the correlation function (see equations below). In another example, the sampling of the sensor response function may be carried out by an optional sampling module comprised in the apparatus 100A, B in which case signals from the wave receiver 230 and wave emitter 220 may be forwarded to the apparatus 100A (or the apparatus 100B) without being pre-processed by the processing module 240 to generate the sensor response function. The processing unit 240 may further be adapted to determine the phase difference between the emitted wave signal 210e and the reflected wave signal 210r and based thereon the distance B.

The sensor signal 105 from the image-capturing device 200 may be input in the determining module 110A (or combining module 110B) to generate the motion signal 115 which is forwarded to the detection module 120A, B. The detection module 120A, B is then configured to detect a component of the motion signal 115 which is indicative of a motion of the object 102. This motion may either relate to a motion in a longitudinal direction (i.e. in the propagation direction of the wave 210) or to a transversal motion (perpendicular to the propagating wave 210). Although for a transversal motion the distance B to the object 102 does not change, this transversal motion may result in a sudden distance change, when the wave 210 is suddenly reflected at the background and not at the object (at the edge of the object 210). Therefore, these transversal motions result, in particular, to motion artifacts that the present disclosure detects.

The sensor signal 105 can be sampled and decomposed into a plurality of harmonics using a discrete Fourier analysis. As long as the object 102 does not move and is at rest, only odd harmonics are comprised in the sensor signal 105, for example. In such a setup, the appearance of at least one even harmonic contribution in the decomposition of the sensor signal 105 indicates a motion of the object 102 and can thus be used as detection signal 125, for example. Therefore, the determining module 110A (or combining module 110B) may generate one or more even harmonics X[2k], or functions f thereof, as the motion signal 115, for example, by forming particular combinations of the sample values x[n].

The system 400 as depicted in FIG. 2 may further comprise an optional masking unit 150 which is configured to use the detection signal 125 to filter or transform at least parts of the image taken by the imaging capturing device 200 in order to eliminate motion artifacts in the image. The image-capturing device 200 may further capture the image pixel by pixel and generate an image comprising a plurality of pixels. For each of the pixels, separate sensor signals 105 are forwarded to the apparatus 100A (or the apparatus 100B) in order to detect whether the respective pixel is subject of a motion artifact so that the masking unit 150 can treat the respective pixel accordingly.

Therefore, in further examples, the image-capturing device 200 is configured to capture an image comprising a plurality of pixels, and wherein the determining module 110A (or combining module 110B) is configured to receive the sensor signal 105 and to generate the motion signal 115 for each pixel of the plurality of pixels without relying on neighboring pixels of the plurality of pixels.

However, the system 400 may not comprise all shown and described components. In the following some further examples are defined for the system 400. The system 400 may comprise at least the apparatus 100A (or the apparatus 100B); and an image capturing device 200 for capturing a three-dimensional image of a target space with an object 102. The image capturing device 200 may comprise a signal-emitting module 220 configured to emit a wave signal 210e into the target space, and a signal-receiving module 230 configured to receive a reflected wave signal 210r which is reflected from the object 102, wherein the image-capturing device 200 is configured to provide the sensor signal 105 which depends on the reflected wave 210r and an information indicative of the phase of the emitted wave signal 210e.

The system 400 optionally further comprises a processing unit 240 which is configured to determine a phase difference between the emitted wave signal 210e and the reflected wave signal 210r and, based thereon, to determine optionally the distance B between the system and the object 102 in the target space.

In system 400 the image capturing device 200 is optionally configured to provide the sensor signal 105 as a plurality of sample values such that at least a portion of each wavelength of the reflected wave 210r is sampled by N values.

In system 400 the light-emitting module 220 is optionally configured to emit a wave signal 210e as a modulated signal using a carrier signal, wherein the processing unit 240 optionally further comprises a demodulator configured to derive the modulated signal, the modulated signal having a predetermined wavelength.

The system 400 is optionally configured to detect the distance B of the object 102 up to a maximal distance, and wherein the predetermined wavelength is optionally selected such that it is longer than the maximal distance (e.g. longer than twice the maximal distance).

The object 102 is optionally located in front of a background 500, the system 400 optionally further comprises a masking module 150 configured to set each pixel value for which the at least one motion signal 115A (or combination 115B) comprises a value being smaller or greater than a predetermined threshold value to a pixel value of the background 500.

In the system 400 the signal-receiving module 230 is optionally configured to capture multiple frames of images of the target space and wherein the apparatus 100A or 100B is optionally configured to detect the motion of the object 102 within each frame of the plurality of frames. The detection of the motion may be done without relying on information present in preceding or subsequent frames.

Figure 3:
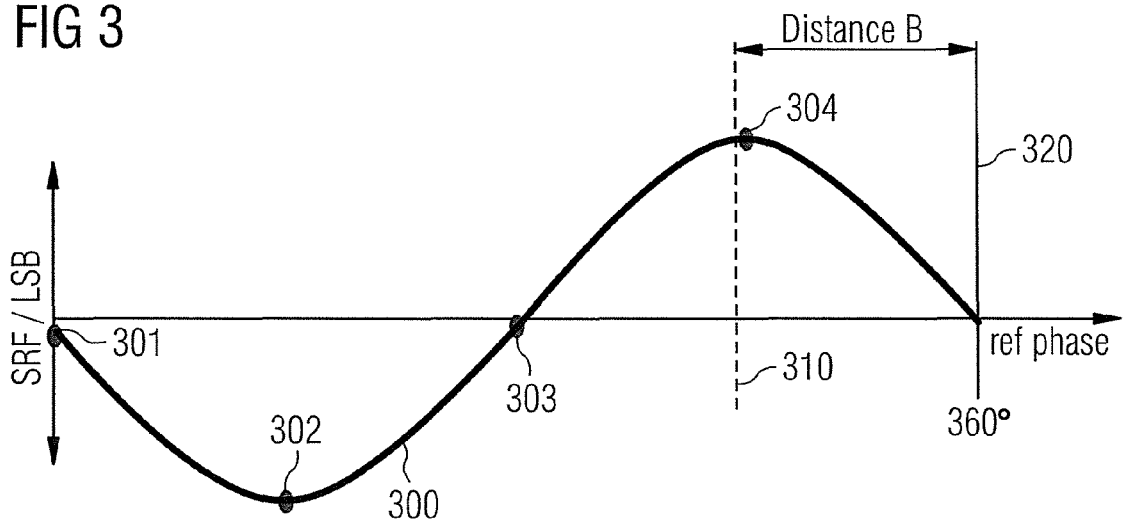
FIG. 3 illustrates a distance measurement using a sensor response function.

FIG. 3 illustrates a distance estimation algorithm, wherein the phase of the fundamental wave (first harmonic) is computed and the distance information is reconstructed from this value. In detail, FIG. 3 depicts a typical shape of a sensor response function as an example for the sensor signal 105, which may represent the correlation between the reflected wave 210r and the emitted wave 210e.

The depicted sensor response function may comprise a harmonic shape, which may or may not be related to the emitted wave 210e. In general, the emitted wave 210e may be modulated with a high frequency carrier signal and represents the low frequency modulated signal. In order to ensure a high sensitivity in the distance region of interest, the wavelength of the low frequency signal may be selected such that a typical distance B is within one wavelength (e.g. in the range from 5% to 90% of the wavelength). Therefore, the sensor response function as depicted in FIG. 3 may be derived from the reflected wave after demodulation.

The sensor response function (measured in units of the least significant bit (LSB)) may be sampled for each pixel which may be needed to reconstruct the respective wave form of the signal received by the wave receiver 230. In the present case, four equidistant samples are taken for the phase angles at 301 (e.g. 0°), 302 (e.g. 90°), 303 (e.g. 180°) and 304 (e.g. 360°) (that relate to respective sampling instances or time points). In other examples, the received signal can be sampled by more or less samples. For example, the number N of samples per wavelength (e.g. of the emitting wave 210e) may be N=3, 4, 6, 8 or any other integer number (larger than 3).

In addition, phase information related to the emitted wave 210e is obtained in order to determine the phase shift correctly. For example, the phase information may be identified by determining (a fundamental and) the maximum or minimum of the SRF. Alternatively, the phase information can be identified with a zero-crossing (e.g. by neglecting a DC offset, a DC offset may shift the zero crossing) of the respective signal so that the phase of the emitted wave 210e may be identified with line 310 implying that line 310 corresponds the time when the emitted wave 210e had a phase angle of 360°. On the hand, the reflected wave 210r traveled from the image-capturing device 200 to the object 102 and back from the object 102 so that the maximum, minimum and/or zero-crossing occurs at the later time 320. This phase shift gives the distance B. The depicted sensor response function including the phase shift may be determined by the processing unit 240.

In the following the motion artifacts in Time-Of-Flight imaging are explained in more detail. The fact that N samples of the sensor response function are acquired sequentially and not simultaneously, seems to allow a consistent measurement only for the case when the distance to the object 102 observed by one pixel remains constant during the sampling procedure. If this distance changes during this sampling period, the sensor response function may become inconsistent and depth artifacts might be introduced and can be eliminated using the present disclosure.

The issue of motion artifacts particularly addresses the domain of object detection, recognition and tracking, which is one main application field of, e.g., Time-Of-Flight cameras. In this scenario, one or more objects in the foreground, which potentially move at a certain speed, may be recognized and tracked in real time. It is evident that due to corrupt information, motion artifacts can challenge the employed algorithm intensively.

Figure 4:
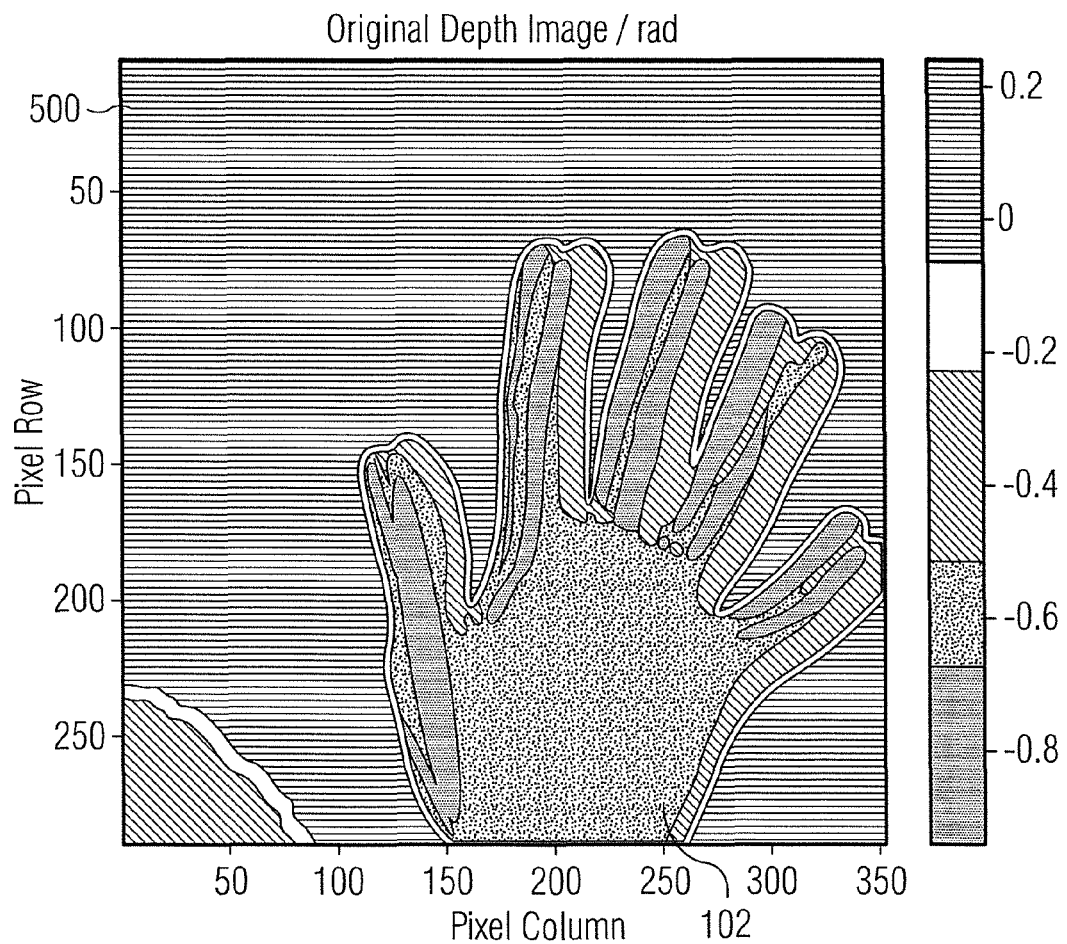
FIG. 4 illustrates a motion artifact caused by a motion of the object.

FIG. 4 depicts a depth image of a regularly-moving hand which shows typical motion artifacts, i.e. the hand is depicted as an example for the object 102 that moves in front of the background 500. Since the contour of the moving hand 102 relates to particular pixels and the detected distance to the object 102/to the background 500 changes rapidly (from the distance of the hand to the background or vice-versa), these pixels or these points of the image are subject to motion artifacts which the present disclosure detects. The motion artifacts are visible in FIG. 4 by blurred boundaries of the depicted hand 102 and the apparatus 100A, B is able to identify the respective pixels to enable a corresponding masking of distorted pixels.

As set out before, the motion artifacts occur when the distance captured by one pixel changes during the sampling procedure and these artifacts relate to modification in the sensor response function.

Figure 5:
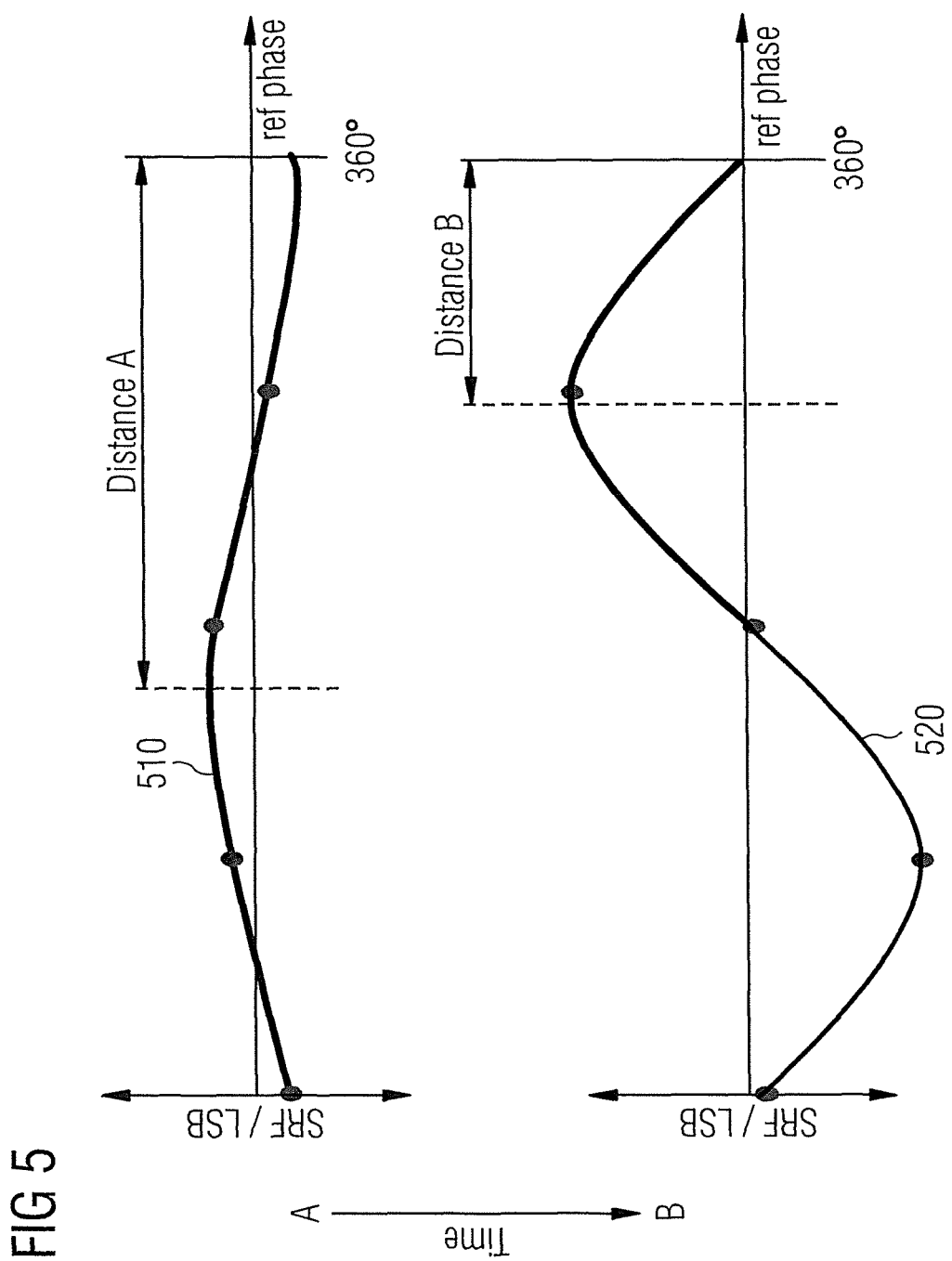
FIG. 5 illustrates a sensor response function related to different distances of the object.

FIG. 5 illustrates an sensor response function SRF of an object in a large distance A (the upper graph 510 of FIG. 5) in comparison to an object at small distance B (the lower graph 520 in FIG. 5). It is noted, due to the fact that the intensity of the emitted wave 210e decreases with the square of the distance, it is a general assumption that larger distances result in sensor response functions with lower amplitudes. Vice-versa, close points as depicted in the lower graph 520 cause in general high amplitudes in the sensor response function.

The two examples of the sensor response function in FIG. 5 relate to the case where the distance of the object does not change. However, if at the time instances, where the samples are acquired, the observed distance had changed from A to B (or vice-versa), the actual captured sensor response function can be modelled as a linear combination (i.e. as a linear fade) of the two underlying sensor response functions. This assumption holds due to the linearity of the optical channel, the sufficiently high linearity of the pixel itself, and is a consequence of the "continuity" of the moving physical object 102.

Figures 6, 7:
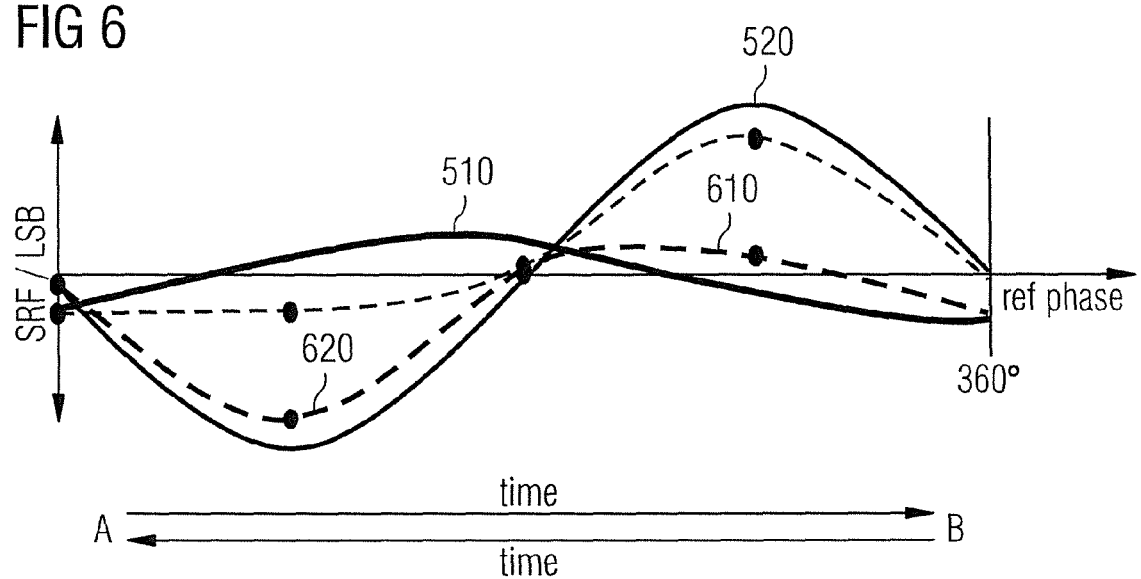
FIG. 6 illustrates an asymmetry introduced to the sensor response function due to distance transitions during the sampling procedure.
FIG. 7 illustrates the connection between motion artifacts and even harmonics.

FIG. 6 depicts the resulting sensor response function, i.e. when the sensor response function 510 is combined with the sensor response function 520 (which are also shown in FIG. 6), wherein the depicted graph 620 corresponds to a motion of the object from the distance A to the distance B and the graph 610 corresponds to a motion from the distance B to the distance A. Therefore, it can be observed that in either direction of the transition, the sensor response function becomes unbalanced (i.e. asymmetric).

The sensor response function can be decomposed using a Fourier analysis so that the sensor response function is representable as a superposition of harmonics (i.e. a plurality of sin- and cos-functions with different wavelengths or frequencies). Hence, as soon as the sensor response function becomes asymmetric, e.g. it is not representable using only odd harmonics, the spectrum is distorted implying that (i) the phase of the fundamental wave no longer yields valid information about the distance, and (ii) even harmonics are introduced into the spectrum. These two occurrences are causally linked. Consequently, even harmonics in the spectrum provide a reliable information whether the distance information is valid or not. In other words, they may provide a measure for the motion artifacts.

In addition, the mean of all samples of the sensor response function shifts as soon as motion artifacts occur. This mean is referred to as so-called DC offset. However, although this mean is ideally zero, in real-world implementations it is not zero. Even worse, the DC offset potentially depends on the sensor response function amplitude in an arbitrary manner. Nevertheless, if treated with particular care, it may provide solid information about motion artifacts as well. For convenience and if not otherwise stated, the DC offset will be included in the term "even harmonic" in the remainder of this disclosure. This is also motivated by the fact that the DC offset refers to the $0^{th}$ bin of the discrete Fourier transformation (see below) and defines the constant part which has an even parity symmetry.

FIG. 7 illustrates the relationship used in this disclosure between the appearance of motion artifacts and the appearance of even harmonics in a decomposition as, for example, the Fourier decomposition (or a discrete Fourier analysis or transformation, DFT).

As set out before, the correlation between the reflected wave signal 210r and the emitted wave signal 210e can be expressed by a correlation function and this correlation function—even though it is not calculated or known in detail—has the property that it can be decomposed in harmonic excitations, which may be done for each pixel of the image separately, i.e. without having further knowledge of the neighboring pixel values. Similarly, the image-capturing device 200 may further be configured to capture multiple images (e.g. as part of a video signal) and these multiple images may be also called frames (e.g. each of images may define a frame). For this case, the apparatus may also be configured to determine the motion signal 115 and the detection signal 125 for each frame without having further knowledge of the previous pixel values.

In particular, as long as the object does not move only odd harmonics may be present in this decomposition (e.g. if distortions due to noise or signal processing are neglected). If the object 102 starts moving, both odd and even harmonics may be part of the Fourier decomposition. Therefore, the fact that not only one kind of the harmonics is present in the Fourier decomposition is a clear indication of a motion of the object 102 and can be used as an indicator for the motion of the object.

Consequently, the core of this disclosure is a single-frame and pixel-based on-chip algorithm for measuring motion artifacts, based on the computation of even harmonics of the SRF.

In very general terms, a derived figure of merit (FoM) for motion artifacts is then any function parameterized by the even harmonics of the SRF (which is given by N equidistant samples), e.g., $$\text{FoM}_{MA} = f(X[0], X[2], X[4], \ldots, X[\lfloor N/2 \rfloor]) \tag{1}$$

with X[k] referring to the $k^{th}$ bin of the N-point DFT of the SRF, i.e., $$X[k] = \frac{1}{N}\sum_{n=0}^{N-1} x[n]e^{-j\frac{2\pi}{N}kn} \ldots k, n\in\{0, 1, \ldots, N-1\}. \quad (2)$$

In this connection, n represents a time index and k represents a frequency index. The function $f$ defining the FoM may be considered as the motion signal 115 of the apparatus 100A, B and can be selected freely. In the simplest case, the function $f$ does not transform the even harmonics so that the FoM is given by one of the X[2k] (k=0, 1, 2, . . . ). In other examples, particular even harmonics can be amplified by the function $f$ if they are of particular interest. The function $f$ may, for example, be implemented with polynomial or exponential behavior, or may also be step function implementing a threshold beyond which a motion is detected so that noise can be filtered. This threshold may be different for different harmonics.

In expression (2), x[n] denotes the SRF with sample index n, taken at reference phases $$\frac{n}{N} \cdot 360° \text{ resp. } 2\pi\frac{n}{N} \text{ rad.}$$

The samples x[n] may be taken as sensor signals 105 input into the apparatus 100A, B and these samples can be taken from any image-capturing device 200 to which the apparatus 100A, B is coupled. It is noted that an N-point DFT yields only valid frequency components up to $\lfloor N/2 \rfloor$.

The disclosure can be implemented on any ToF imager (i.e. image-capturing device 200) that delivers raw data of the SRF as an output. A realization on a ToF system that operates with four reference phases may be particularly simple. In this case, the $0^{th}$ and $2^{nd}$ harmonic are computed as follows $$X[0]=\tfrac{1}{4}(x[0]+x[1]+x[2]+x[3]), \quad (3)$$

$$X[2]=\tfrac{1}{4}(x[0]-x[1]+x[2]-x[3]) \quad (4)$$

which requires only very basic arithmetic operations. For this example (with N=4), two observations from the Fourier analysis may be emphasized:

The second harmonic is the only even harmonic that can be computed, and includes aliased components of all even harmonics.

The second harmonics is always real-valued.

Observation (i) may or may not have a positive effect, but apparently observation (ii) simplifies notably the calculation, because of the absence of complex values.

In one example, two very basic FoM defining the motion signal 115 may be defined using the identity function for function $f$ in eq. (1), i.e., $$\text{FoM}_{MA,4ph\_0}=X[0]=\tfrac{1}{4}(x[0]+x[1]+x[2]+x[3]), \quad (5)$$

$$\text{FoM}_{MA,4ph\_2}=X[2]=\tfrac{1}{4}(x[0]-x[1]+x[2]-x[3]). \quad (6)$$

Therefore, the motion signal 115 may simply be the sum or alternating sum of subsequent sample values. It is noted, no absolute value or any other operations may be performed on the sample values so that the motion signal 115 can be derived by simple computations.

In another example, the value N may be different. For example, N may be selected to be 8 in which case the fourth harmonic would be real-valued and may be suited as motion signal 115. In general, N may be selected to be even-valued and the harmonic of order N/2 may be selected as motion signal 115. However, in yet another example, these values may be selected differently. By selecting an even-valued number of samples N, a mixing of even and odd harmonics due to aliasing effects may be avoided.

This simple result is based on the fact that even harmonics are a measure for motion artifacts—it is not an estimate. The computation algorithm is static and does not require any probabilistic considerations and/or parameterization. The employed algorithm can be implemented on-chip in a very straight-forward manner. The computation of even harmonics does not need any additional storage elements nor does it require a complex arithmetic. Moreover, the approach operates on a per-pixel basis, thus no knowledge about neighboring pixels is required. The approach bases on N samples of a current frame only, thus it does not need any information about past/future frames and is thus memoryless. The measure is continuous and not discrete (such as for event-detection based algorithms). Consequently, it contains information about the severity of motion artifacts. Information about the direction (near-to-far/far-to-near) may be extracted as well.

Figure 8:
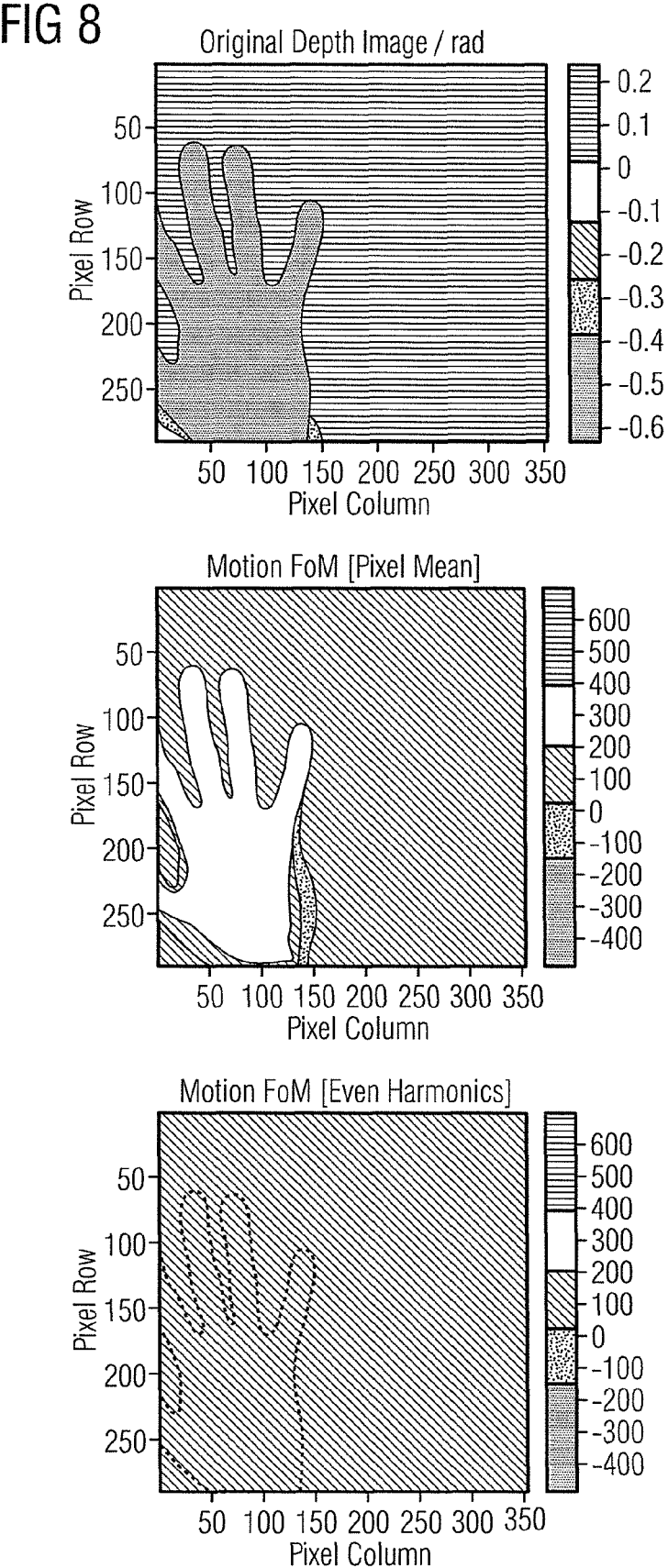
FIG. 8 illustrates an image without a moving object.
Figure 9:
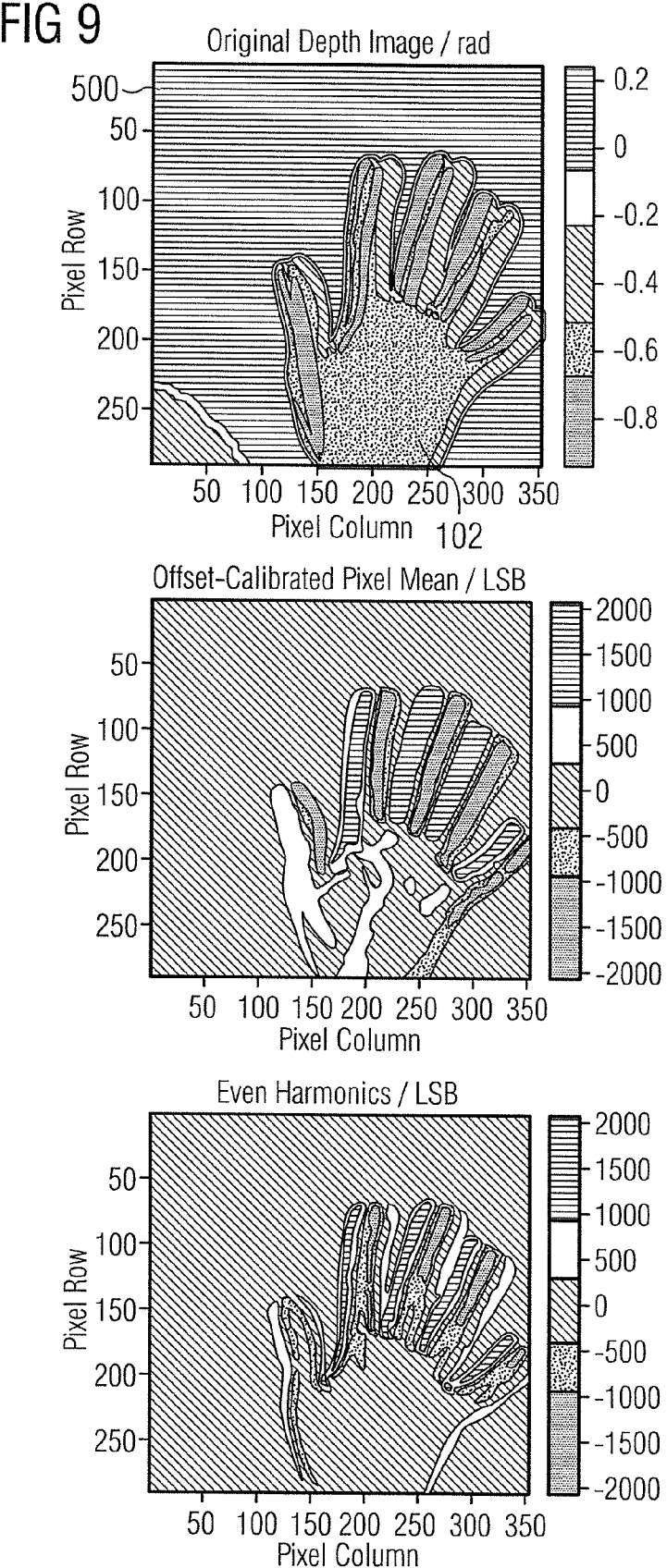
FIG. 9 illustrates the image of FIG. 8 with a regular motion of the object.
Figure 10:
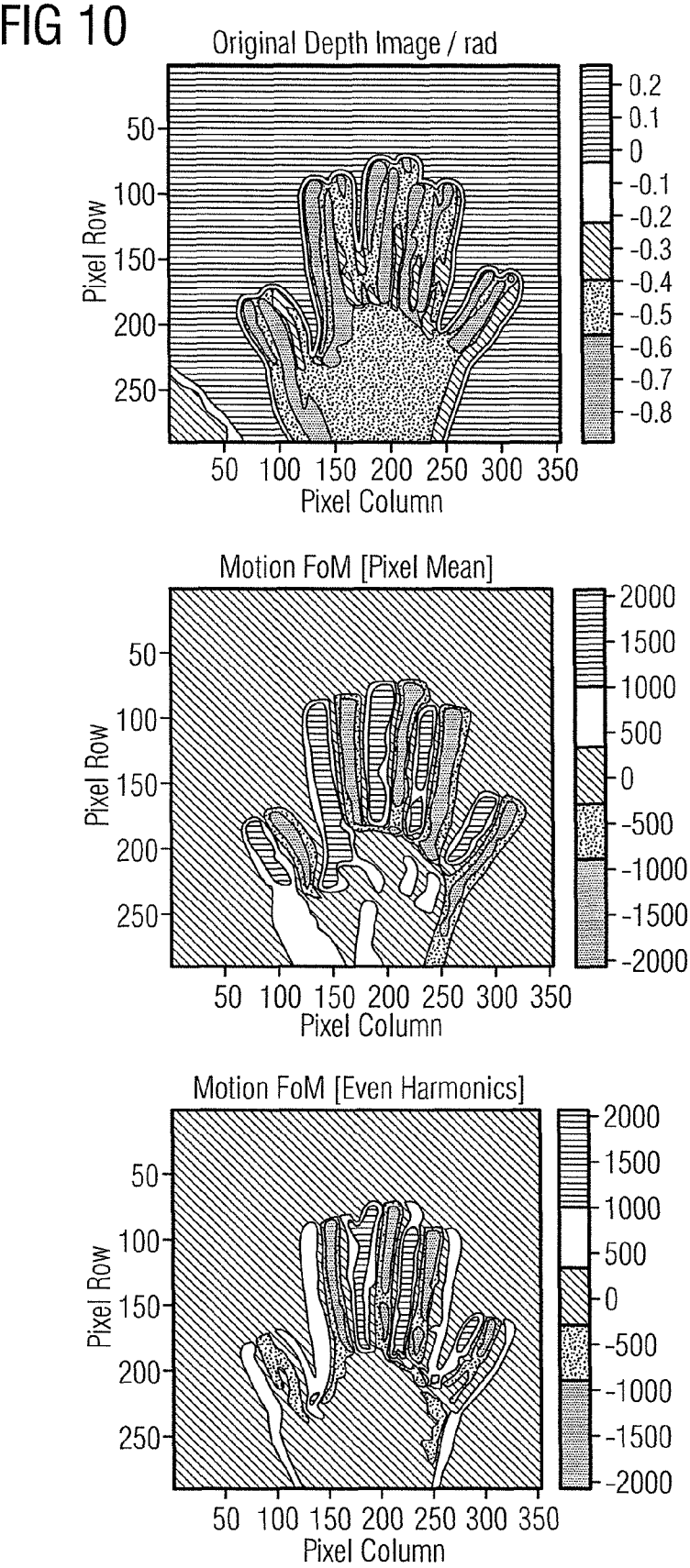
FIG. 10 illustrates an image with a strongly moving object.

The potential of this disclosure is further evident from the results depicted in FIGS. 8 to 10.

FIG. 8 is a depth image of a non-moving hand 102 (left), whereas in the center the resulting $\text{FoM}_{MA,4ph\_0}$ (DC offset or $0^{th}$ harmonic) and on the right the resulting $\text{FoM}_{MA,4ph\_2}$ ($2^{nd}$ harmonic) are depicted.

FIG. 9 is a depth image of a regular-moving hand 102 (left), whereas again in the center the resulting $\text{FoM}_{MA,4ph\_0}$ (DC offset) and on the right the resulting $\text{FoM}_{MA,4ph\_2}$ ($2^{nd}$ harmonic) are depicted.

FIG. 10 is a depth image of a strongly-moving hand 102 (left), whereas again in the center the resulting $\text{FoM}_{MA,4ph\_0}$ (DC offset) and on the right the resulting $\text{FoM}_{MA,4ph\_2}$ ($2^{nd}$ harmonic) are depicted.

From these FIGS. 8 to 10 one may derive that the information present in the $2^{nd}$ harmonic appears to be notably more precise in spatial terms than the DC-offset, the direction of the movement (far-to-near vs. near-to-far) is more consistently contained in the DC offset. However, it can be seen in the scenario with the non-moving hand 102 that the DC offset is strongly influenced by changing amplitudes of the SRF. Moreover, FIG. 8 (center) shows that the DC-offset is not a strong indication of motion artifacts, because it remains non-zero even for a hand at rest (non-moving hand), whereas the second harmonic generates a signal proportional to the degree of motion.

The performance of the proposed FoM was evaluated on a standard four-phase ToF system for different scenarios (no motion/regular motion/strong motion), see FIGS. 8 to 11. The DC offset of the pixels is potentially non-zero so that an initial offset-calibration with the background image (i.e., without the hand) may be conducted.

In order to further show the potential of the proposed FoM of the present disclosure a short outline and performance evaluation of a compensation algorithm is provided.

Given the current scenario of a moving hand in front of a distant background, for example, either the transition "far-to-near" (i.e. from the background to the hand) or "near-to-far" (i.e. from the hand to the background) may be detected. After detection, a replacement of the respective pixels may be carried out. For example, the depth values of the pixels in question can be replaced with background information (depth_background), if this information is known, or otherwise with another value different from the depth value of the hand.

In the detection procedure, an appropriate binary threshold (FOM_THRESHOLD) may be applied to the $2^{nd}$ harmonic FoM yielding a mask where artifacts may be suppressed or not. For example, for each pixel at position (x, y)

if(FoM(x,y)>FOM_THRESHOLD)

depth(x,y)=depth_background(x,y)

which sets the depth value of the respective pixel at the background value, for example, if the second harmonic X[2] is greater than the binary threshold.

Figure 11B:
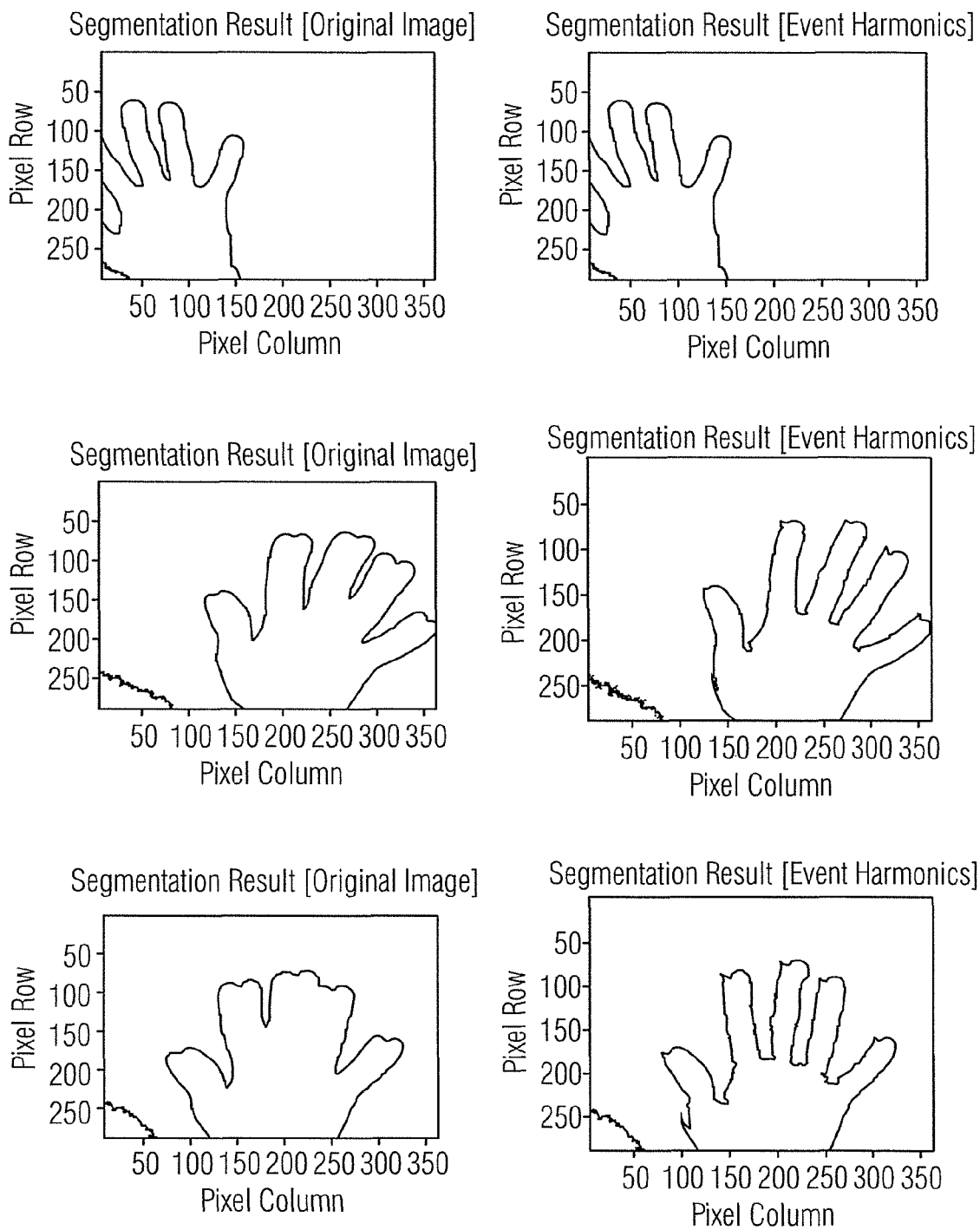
FIG. 11 illustrates a comparison of images with moving objects with and without filtering the motion artifacts.

FIG. 11 shows the results of this very simple suppression algorithm for each scenario (rows). The top row depicts the non-moving hand, the middle row the regularly-moving hand and the lower row the strongly-moving hand. The pictures in the most left column are the respective depth images and the pictures in the second column (from the left) are processed depth images. The pictures in the right columns show the result of the very basic binary segmentation with an appropriate threshold, i.e. in the third column (from left) shows the segmentation result for the original depth images and the fourth column (from left) shows the processed segmentation results. This segmentation may again be obtained by setting pixel values, for which FoM (e.g. X[2]) is greater than the threshold, to the background values. The segmentation results in both columns on the right may be obtained by a simple binary segmentation (to set the values to "0" for the background or "1" for the hand), e.g. defined by:

if(depth(x,y)<DEPTH_THRESHOLD)
hand_segmented(x,y)=1; // Hand
    else
hand_segmented(x,y)=0; // Background.

The processed columns (the second and fourth columns) in FIG. 11 indicate that motion artifacts were suppressed according to the presented algorithm. It is evident that motion artifacts are reduced significantly, even in the case of a strongly moving hand.

The described implementation uses static information about the background, which is probably either not suitable (moving background) or not feasible (memory limits). It may be emphasized that a concept of a more sophisticated and efficient suppression algorithm may be developed. It does not need any additional memory but solely relies on depth information that is still in the memory from the past frame.

FIG. 12 shows a flow chart of a method 700 for detecting a motion of an object 102 in a target space, wherein the object 102 is located at a distance B from an image capturing device 200 which is configured to measure the distance B and to provide a sensor signal 105 indicative of the distance B. The sensor signal 105 is decomposable in a decomposition comprising using odd harmonics if the object 102 is at rest. The method 700 comprises receiving S110 the sensor signal 105; generating S120 at least one motion signal 115 which depends on at least one even harmonic in the decomposition of the sensor signal 105; and detecting S130 the motion of the object 102 based on the at least one motion signal 115 and providing a detection signal 125 indicating the motion of the object 102.

In method 700 the image capturing device 200 is optionally configured to capture an image comprising a plurality of pixels and wherein the sensor signal 105 comprises optionally pixel values for each pixel of the plurality of pixels, wherein at least one of the acts of receiving S110, of generating S120 and of detecting S130 is optionally carried out relying only on pixel values of one pixel.

In summary, this disclosure describes a fast and robust way to measure the described motion artifacts, basing solely on N samples of the pixel output, that means, without requiring any additional knowledge such as past frames, pixel neighborhood, etc. The computation may be carried out on chip and in real time and serves as a basis for correction algorithms.

The apparatus 100A, B according to the present disclosure has thus a low complexity and does not need any past or neighboring samples or pixels and does not yield a binary measure for motion artifacts, but provides a quasi-continuous measure indicating the presence of motion artifacts. Hence, the apparatus according to the present disclosure does not require high computational resources and may be applicable in real time applications, where high frame rates are a demand.

The apparatus 100A, B may comprise one or more additional optional features corresponding to one or more aspects mentioned in connection with the proposed concept or one or more examples described above.

The method 700 may comprise one or more additional optional acts corresponding to one or more aspects mentioned in connection with the proposed concept or one or more examples described above.

An example relates to a method 700 for detecting a motion of an object 102 in a target space, wherein the object 102 is located at a distance B from an image capturing device 200 which is configured to measure the distance B and to provide a sensor signal 105 indicative of the distance B. The sensor signal 105 is decomposable in a decomposition comprising using only odd harmonics if the object 102 is at rest. The method 700 comprises receiving S110 the sensor signal 105; generating S120 at least one motion signal 115 which depends on at least one even harmonic in the decomposition of the sensor signal 105; and detecting S130 the motion of the object 102 based on the at least one motion signal 115 and, if the motion has been detected, providing a detection signal 125 indicating the motion of the object 102.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and en-code machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

The invention claimed is:

1. An apparatus for detecting a motion of an object in a target space, wherein the object is located at a distance from an image-capturing device configured to measure the distance and to provide a sensor signal indicative of the distance, the sensor signal being decomposable in a decomposition comprising odd harmonics if the object is at rest, the apparatus comprising:
   a determining circuit configured to receive the sensor signal and to generate at least one motion signal based on at least one even harmonic of the decomposition of the sensor signal; and
   a detection circuit configured to detect the motion of the object based on the at least one motion signal and to provide a detection signal indicating the motion of the object,
   wherein the image-capturing device is configured to capture an image comprising a plurality of pixels, and wherein the determining circuit is configured to receive the sensor signal and to generate the motion signal for each pixel of the plurality of pixels without relying on neighboring pixels of the plurality of pixels.

2. The apparatus according to claim 1, wherein the image capturing device is configured to emit a wave, to receive a reflected wave being reflected at the object, and to provide the sensor signal as a sensor response function, the apparatus further comprising a sampling circuit configured to sample the sensor signal such that at least one portion of each wavelength of the reflected wave is sampled by N values.

3. The apparatus according to claim 2, wherein the number of samples N is even and the at least one even harmonic has the order N/2.

4. The apparatus according to claim 2, wherein the motion signal is derived only from the N sample values associated with the at least one portion of each sampled wavelength of the reflected wave.

5. The apparatus according to claim 1, wherein the at least one even harmonic in the motion signal is the second harmonic.

6. The apparatus according to claim 1, wherein the at least one even harmonic in the motion signal further comprises the zeroth harmonic representing an offset.

7. A system comprising:
   an apparatus for detecting a motion of an object in a target space, wherein the object is located at a distance from an image-capturing device configured to measure the distance and to provide a sensor signal indicative of the distance, the sensor signal being decomposable in a decomposition comprising odd harmonics if the object is at rest, the apparatus comprising:
   a determining circuit configured to receive the sensor signal and to generate at least one motion signal based on at least one even harmonic of the decomposition of the sensor signal; and
   a detection circuit configured to detect the motion of the object based on the at least one motion signal and to provide a detection signal indicating the motion of the object; and an image capturing device for capturing a three-dimensional image of a target space with an object, wherein the image capturing device comprises
  a signal-emitting circuit configured to emit a wave signal into the target space, and
  a signal-receiving circuit configured to receive a reflected wave signal which is reflected from the object,
wherein the image-capturing device is configured to provide the sensor signal which depends on the reflected wave and an information indicative of the phase of the emitted wave signal.

8. The system according to claim 7, further comprising a processing circuit configured to determine a phase difference between the emitted wave signal and the reflected wave signal and, based thereon, to determine the distance between the system and the object in the target space.

9. The system according to claim 8, wherein the signal-emitting circuit is configured to emit the wave signal as a modulated signal using a carrier signal, wherein the processing circuit further comprises a demodulator configured to demodulate the modulated signal, the modulated signal having a predetermined wavelength.

10. The system of claim 9, wherein the system is configured to detect the distance of the object up to a maximal distance, and wherein the predetermined wavelength is selected such that it is longer than twice the maximal distance.

11. The system according to claim 7, wherein the object is located in a further distance from a background, the system further comprising a masking circuit configured to set each pixel value for which the at least one motion signal comprises a value being smaller or greater than a predetermined threshold value to a pixel value of the background.

12. The system according to claim 7, wherein the signal-receiving circuit is configured to capture multiple frames of images of the target space and wherein the apparatus is configured to detect the motion of the object within each frame of the plurality of frames.

13. A method for detecting a motion of an object in a target space, wherein the object is located at a distance from an image capturing device configured to measure the distance and to provide a sensor signal indicative of the distance, the sensor signal being decomposable in a decomposition comprising odd harmonics if the object is at rest, the method comprising:
  receiving the sensor signal comprising an arbitrary number of substantially equidistantly sampled values per frame;
  generating at least one motion signal based on at least one harmonic of a second type in the decomposition of the sensor signal for each frame; and
  detecting the motion of the object based on the at least one motion signal and providing a detection signal indicating the motion of the object,
  wherein the image capturing device is configured to capture an image comprising a plurality of pixels and wherein the sensor signal comprises pixel values for each pixel of the plurality of pixels, wherein at least one of the acts of receiving, of generating and of detecting is carried out relying only on pixel values of one pixel.

14. The apparatus of claim 1, wherein the apparatus is configured to use the motion signal to reduce motion artifacts.

15. The apparatus of claim 7, wherein the apparatus for detecting a motion of an object in a target space is configured to use the motion signal to reduce motion artifacts.

16. The method of claim 13, wherein the motion signal is used to reduce motion artifacts.

* * * * *